(12) United States Patent
Hughes et al.

(10) Patent No.: US 12,216,316 B2
(45) Date of Patent: Feb. 4, 2025

(54) EXTERNAL LASER SOURCE PHYSICAL CONTACT VERIFICATION OF A FIBER OPTIC FERRULE

(71) Applicant: US Conec, Ltd, Hickory, NC (US)

(72) Inventors: Michael E. Hughes, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 367 days.

(21) Appl. No.: 17/728,683

(22) Filed: Apr. 25, 2022

(65) Prior Publication Data
US 2022/0342166 A1    Oct. 27, 2022

Related U.S. Application Data

(60) Provisional application No. 63/178,987, filed on Apr. 23, 2021.

(51) Int. Cl.
| | | |
|---|---|---|
| *G02B 6/42* | (2006.01) | |
| *G01M 11/00* | (2006.01) | |
| *H04B 10/25* | (2013.01) | |
| *H04B 10/40* | (2013.01) | |

(52) U.S. Cl.
CPC .......... *G02B 6/4246* (2013.01); *G01M 11/31* (2013.01); *G02B 6/4286* (2013.01); *H04B 10/25* (2013.01); *H04B 10/40* (2013.01); *G02B 6/4296* (2013.01)

(58) Field of Classification Search
CPC ...... G02B 6/42; G02B 6/4286; G02B 6/4296; G01M 11/31
See application file for complete search history.

(56) References Cited

U.S. PATENT DOCUMENTS

| | | | | |
|---|---|---|---|---|
| 5,214,730 A | * | 5/1993 | Nagasawa | G02B 6/389 385/71 |
| 7,448,809 B2 | * | 11/2008 | Cody | G02B 6/3885 65/408 |
| 10,598,864 B2 | | 3/2020 | Royer et al. | |
| 2016/0341904 A1 | * | 11/2016 | Morin-Drouin | G02B 6/3628 |
| 2021/0011227 A1 | * | 1/2021 | Jian | G02B 6/3865 |

FOREIGN PATENT DOCUMENTS

| | | |
|---|---|---|
| CN | 111897060 B | 5/2022 |
| WO | 2021217050 A1 | 10/2021 |

* cited by examiner

*Primary Examiner* — Tina M Wong
(74) *Attorney, Agent, or Firm* — Michael L Leetzow PLLC; Shubhrangshu Sengupta

(57) ABSTRACT

A fiber optic ferrule having an angled endface is used in a system where the system can detect back reflection if there is an air gap but not if the fiber optic ferrule is physically mated to another optical device such as a fiber optic ferrule or transceiver. The angle of the end face is preferably between 3 and 5° and most preferably about 4° for most systems. No special detection equipment is needed to infer and determine an acceptable physical contact between two mated fiber-optic ferrules having the angled end faces.

16 Claims, 5 Drawing Sheets

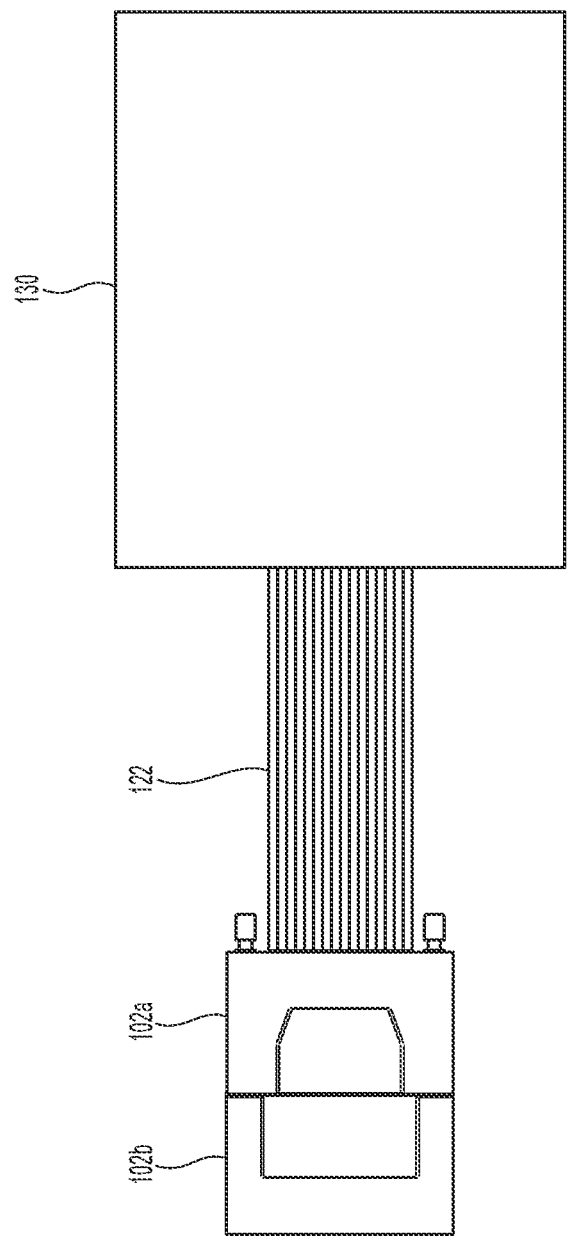

EXTERNAL LASER SOURCE PHYSICAL CONTACT VERIFICATION OF A FIBER OPTIC FERRULE

REFERENCE TO RELATED CASE

This application claims priority under 35 U.S.C. § 119 (e) to U.S. provisional application No. 63/178,987 filed on Apr. 23, 2021, the contents of which are hereby incorporated by reference in their entirety.

BACKGROUND OF THE INVENTION

Laser sources that are replaceable independent of the other co-packaged optics (CPO) on the front panel of a system are known as external laser sources (ELS). Such laser sources are typically collocated with photodetectors for reception, and together the photodetectors and the lasers form a transceiver unit. However, the ELSs may have a higher power than has typically been used before. Thus, when the ELSs are replaced, the optical connections between the ELS and the CPO need to be clean and free from air gaps between the fiber optic ferrules or the back reflection of the optical signals from the ELS may cause issues in the system, including the possibility that the optical fibers in the system may melt due to the higher power of the optical signal from the ELS.

The back reflection of the optical signal can be monitored by the photodetectors. However, for higher angled end faces of the fiber optic ferrules used to optically join the components, the monitoring may not be able to determine if there is an air gap present in the system. Currently, fiber optic ferrules have either a 0° end face or one with an angle of 8°. With a 0° end face, most systems are able to detect the back reflection if there is an air gap due to the very high back reflection. The 8° angled end face is typically desired for single-mode fiber applications due to the very low back reflection back into the optical fiber. Such low back reflection is very hard to detect However, if there is an air gap that is contributing to the back reflection, the end user in the field cannot detect such an air gap due to the relatively low sensitivity of the photodetector of the transceiver. As such, highly specialized and expensive detection equipment, typically unavailable in the field, may be able to detect an air gap if present with the 8° end face angle ferrule mating with another such ferrule. Further, having an angle and an end face of the ferrule loosens some tolerance requirements that are associated with flat polished (0° end face) ferrules. Accordingly, there is a need in the industry to reap the advantages of the angled end face of the ferrule (as opposed to a flat 0° end face), while at the same time, having a capability to easily detect any air gaps between mated ferrules using simply the field available transceiver photodetector with a relatively lower sensitivity compared to expensive laboratory test equipment.

SUMMARY OF THE INVENTION

According to one aspect, the present invention is directed to a fiber optic ferrule that includes a top surface, a bottom surface, a first side surface and a second side surface extending between the top surface and the bottom surface, a front face extending between the top surface and the bottom surface, a rear face extending between the top surface and the bottom surface and having an opening to receive optical fibers for termination at the fiber optic ferrule, and a longitudinal axis extending between the front face and the rear face, wherein the front face has an angle relative to a plane perpendicular to the longitudinal axis, the angle being between 1 and 7 degrees.

In some embodiments, the angle is about 4 degrees.

According to another aspect, the present invention is directed to a fiber optic ferrule that includes a main body having a top surface and a bottom surface, a first side surface extending between the top surface and the bottom surface and a second side surface extending between the top surface and the bottom surface on opposites sides of the main body, an end face at a front end of the main body, and a rear face at a rear end of the main body, a rear central opening extending into the main body from the rear end face and configured to receive at least one optical fiber; and wherein the end face at the front end of the main body is angled between 1 and 7 degrees such that a distance between the front face and the rear face is greater on the top surface than on the bottom surface.

In some embodiments, the fiber optic ferrule has a back-reflection of an optical signal sent through the at least one optical fiber when exposed to air, the back-reflection being at a first predetermined value and the first predetermined value is detectable by a detection apparatus.

In some embodiments, the fiber optic ferrule has a back-reflection of an optical signal sent through the at least one optical fiber when the fiber optic ferrule is in physical contact with a second fiber optic ferrule, the back-reflection having a second predetermined value and the second predetermined level is not detectable by the detection apparatus.

In yet another aspect, there is a fiber optic ferrule with at least one optical fiber that includes a front face having an angle and is non-perpendicular to a longitudinal axis through the fiber optic ferrule, the fiber optic ferrule having a back-reflection of an optical signal sent through the at least one optical fiber when exposed to air, the back-reflection being at a first predetermined value, the fiber optic ferrule having a back-reflection of an optical signal sent through the at least one optical fiber when the fiber optic ferrule is in physical contact with a second fiber optic ferrule, the back-reflection having a second predetermined value, wherein the first predetermined level is detectable by a detection apparatus and the second pre-determined level is not detectable by the detection apparatus.

In some embodiments, the angle is 4 degrees.

In some embodiments, the optical signal sent through the at least one optical fiber is at a low power.

In some embodiments, the optical signal is sent through the at least one optical fiber at a higher power only after the back-reflection is not detectable by the detection apparatus.

In some embodiments, the first predetermined level is between −18 dB and −55 dB of optical power.

In some embodiments, the second predetermined level is less than −55 dB of optical power.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 11 is a schematic showing two mated fiber optic ferrules, one of which is connected to a laser source by optical fibers.

DETAILED DESCRIPTION OF THE INVENTION

Figure 1:
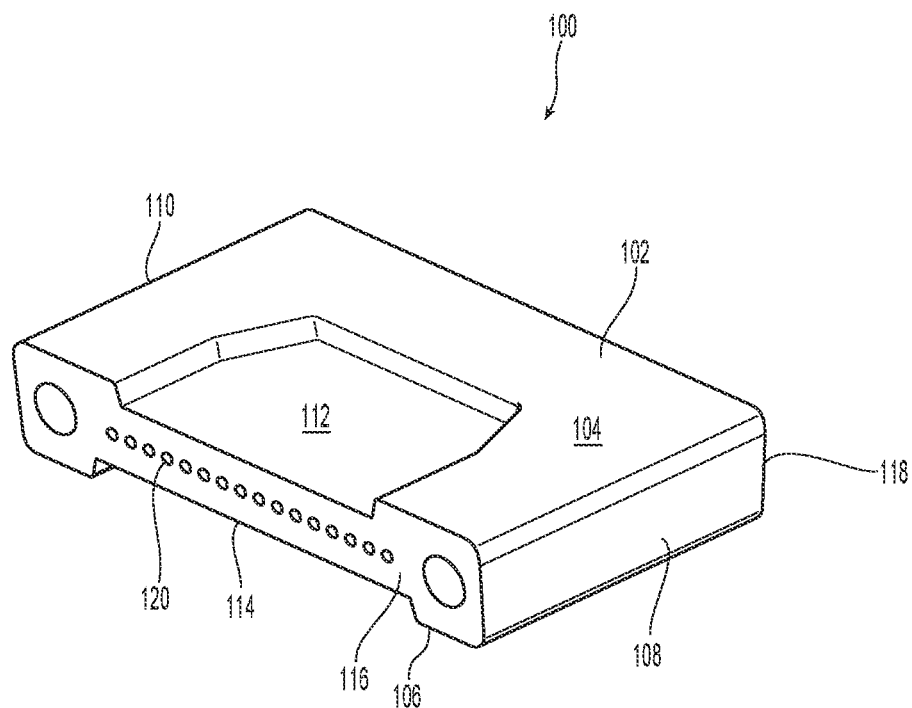
FIG. 1 is a perspective view of one embodiment of a fiber optic ferrule according to the present invention.
Figure 2:
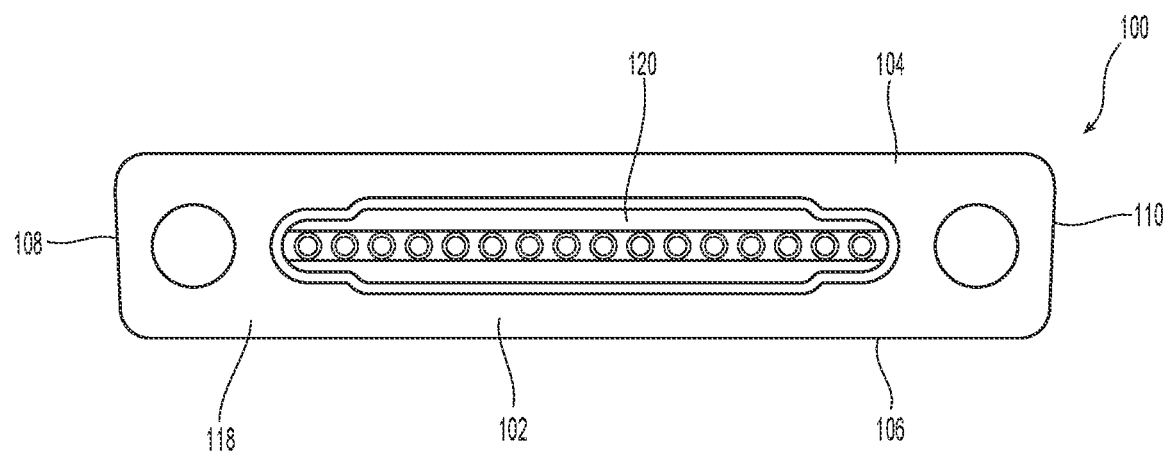
FIG. 2 is a rear elevational view of the fiber optic ferrule in FIG. 1.
Figure 3:
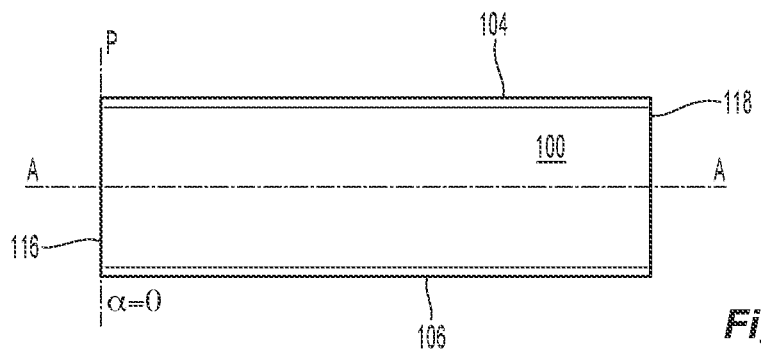
FIGS. 3-7 are side elevation views of the fiber optic ferrule in FIG. 1 with differing front face angles.
Figure 4:
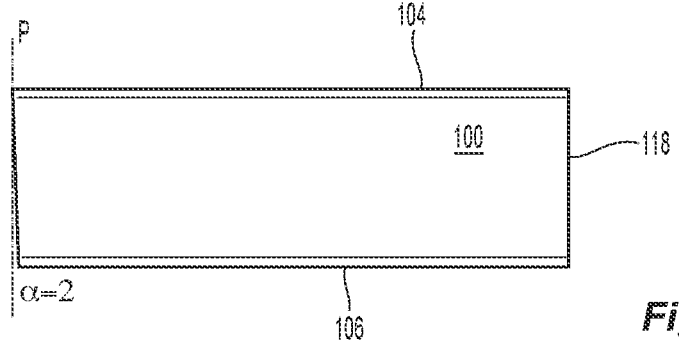
Figure 5:
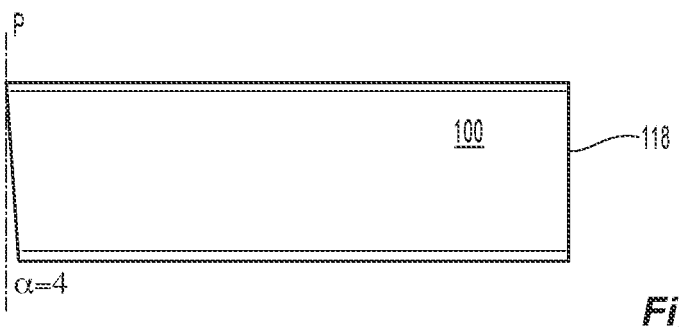
Figure 6:
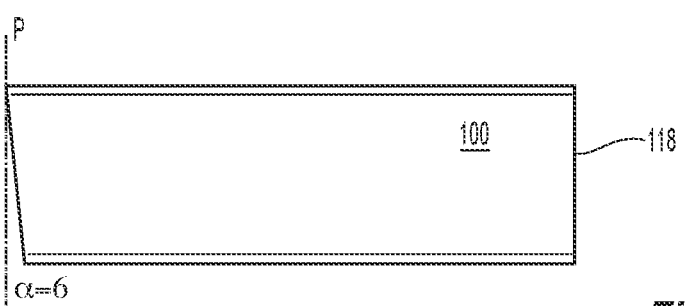
Figure 7:
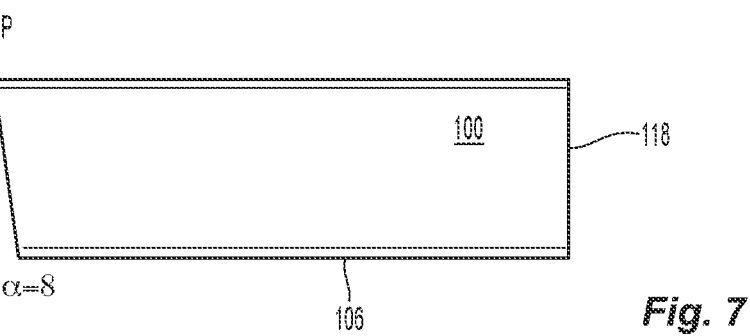

Reference will now be made in detail to the present preferred embodiment(s) of the invention, examples of which are illustrated in the accompanying drawings. Whenever possible, the same reference numerals will be used throughout the drawings to refer to the same or like parts. Various aspects of the present invention use a smaller end face angle of the ferrule to allow for the system to identify when there is an air gap or other issue before allowing a higher power signal to be sent through the optical fibers. That is, instead of having the conventional end face angle of 8°, the present invention utilizes lower end face angles that still provide a level of back reflection that falls within a range detectable by the standard photodetectors to infer whether or not an air gap is present when two such ferrules are mated. Such a range may include a predetermined value that is specific to the photodetector in use.

Illustrated in FIG. 1 is one example of a fiber optic ferrule 100 according to the present invention. The fiber optic ferrule 100 has a main body 102 with a top surface 104, a bottom surface 106, a first side surface 108 and a second side surface 110. The first side surface 108 and the second side surface 110 extend between the top surface 104 and the bottom surface 106. The fiber optic ferrule 100 may also have cutouts 112 and 114 as illustrated in FIG. 1, but that is not a requirement. For example, the ferrule may have shoulders instead of the cutouts 112,114. The fiber optic ferrule 100 has a front face 116 extending between the top surface 104 and the bottom surface 106 and each of the side surfaces 108,110. Additionally, the fiber optic ferrule 100 has a rear face 118 extending between the top surface 104 and the bottom surface 106 and has an opening 120 to receive optical fibers 122 for termination at the fiber optic ferrule 100. See also FIG. 11.

The structure of the fiber optic ferrule 10 is further discussed in Applicant's pending WIPO published patent application WO 2021/217050, as well as the corresponding priority U.S. provisional patent application No. 63/014,491 thereof, the contents of both applications are incorporated herein by reference.

The fiber optic ferrule 100 also includes a longitudinal axis A that extends between the front face 116 and the rear face 118 and is parallel to the top surface 104 and the bottom surface 106. See, FIG. 3. There is also a plane P that is perpendicular to the longitudinal axis A that is used as a reference plane with regard to the front face 116. The front face 116 has an angle α relative to the plane P, the angle α being between 1 and 7 degrees. See, e.g., FIGS. 3-7 showing the fiber optic ferrule 100 with different angles of end faces of 0, 2, 4, 6, and 8°, respectively. The angle α is preferably between 3 and 5 degrees and most preferable about 4°. However, in an alternative scenario, when the system is more tolerant to a higher back reflection, but it is still desired to have some benefits of the angled end face, an end face angle of 0° to 1° could be used. The back reflection into the optical fiber is maximum for a 0° end face (flat polished) ferrule with an air gap with another similar ferrule. The back reflection falls as the end face angle is increased.

Figure 8:
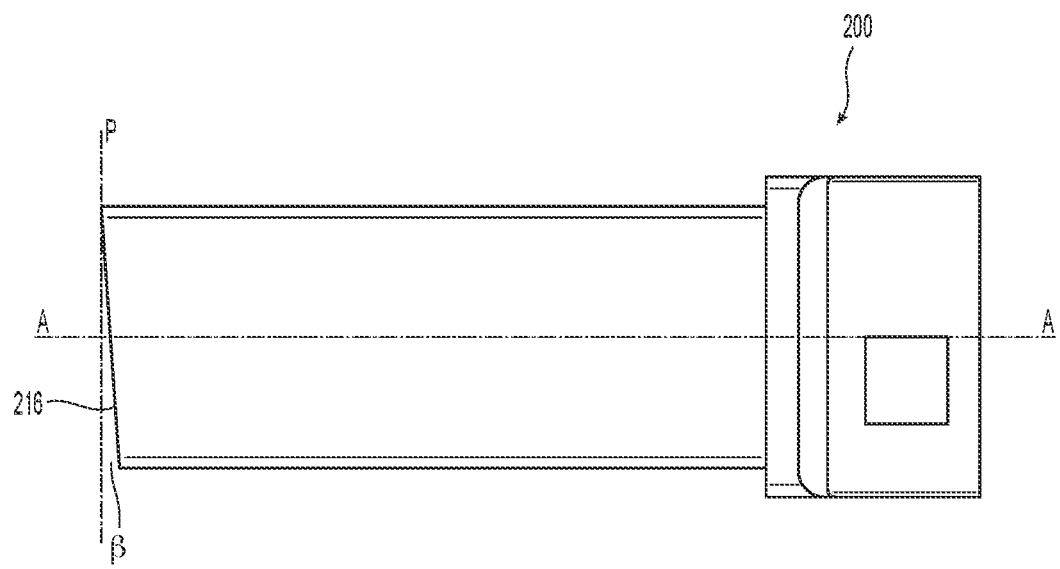
FIG. 8 is a side elevational view of another embodiment of a fiber optic ferrule according to the present invention.

FIG. 8 is another fiber optic ferrule 200 that is another embodiment of a fiber optic ferrule according to the present invention. In this case, the fiber optic ferrule 200 is a multi-fiber MT ferrule 200 that has a corresponding longitudinal axis A and a plane P that is perpendicular thereto. The front face 216 also forms an angle β with the plane P. The invention may also use other fiber optic ferrules (e.g., single fiber ferrules) that have a different format and a different number of optical fibers that are secured therein. The fiber optic ferrules may be made of a variety of materials, e.g., plastic, ceramic, glass, etc. They may also have configurations of the LC, SC, MMC type ferrules, among others.

Figure 10:
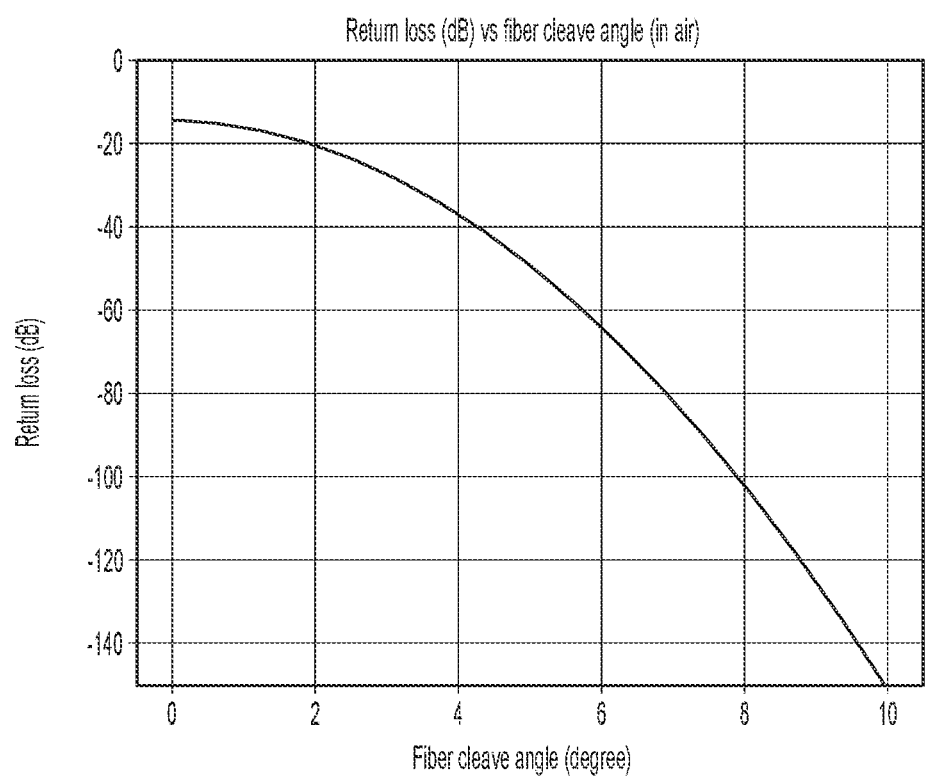
FIG. 10 is a figure showing the back-reflection of an optical signal in a fiber optic ferrule for end face angles from 0 to 10 degrees when exposed to air.

Turning now to the effect of the end face angles on the back-reflection, FIG. 10 is beneficial. The graph in FIG. 10 shows the back reflection (optical power) as a function of the fiber cleave angle (the angles of the end faces and the optical fibers being the same) for the fiber optic ferrules 100,200 in air. That is, the values are for the situation where the end of the optical fibers 122 are exposed to air rather than another optical fiber or surface. At an angle of 0°, the back-reflection is at −18 dB—a high value, which is easily detectable by a standard photodetector to determine that the ferrules have an air gap and are not properly mated. At the other end of the curve is the angle of 10°, where the back reflection is about −150 dB, a very small value, which is almost impossible to detect even with the most sophisticated and expensive detection equipment (not available in the field).

When the fiber optic ferrules 100,200 are appropriately mated to another similar fiber optic ferrule or opto-electronic apparatus with physical contact of the fibers at the fiber cores, the back reflection is significantly less than when there is an air gap between the fiber tips regardless of the angle of the end face. It is also important to note that most of the detection apparatus that measure the back reflection are not able to detect less than −55 to −65 dB at most. Thus, returning to the graph in FIG. 10, most detectors are not able to measure the back reflection for fiber optic ferrules of more than 6° when exposed to air (i.e., when an air gap may be present). Again, the detection apparatus is also not able to measure the back reflection for any of the angles (0-10) when the fiber optic ferrule 100,200 are properly mated (i.e., when no air gap is present). Thus, if a fiber optic ferrule with a face angle of 6° or greater were to have an air gap at the end face, the detector would not be able to inform the user whether the fiber optic ferrule was appropriately mated or not. The user may incorrectly assume that since no back reflection was detected, the ferrules must supposedly be mated together properly (a false positive). This may lead to undiagnosable problems in the optical link, where there would be a loss due to the air gap(s) but not a good way to pin point where the optical loss was occurring. In addition, the end user may send a full power signal assuming that there was no air gap, which may then damage the optical fiber because in reality, there was back reflection on top of the full power optical signal inside the optical fiber. Further, with an air gap present, over time debris could fill in a portion of the air gap. Studies have shown that permanent damage of the fibers can occur when high power is transmitted between fibers that are contaminated with debris.

Therefore, it would be best to have an end face angle ($\alpha$) where the back reflection in air is greater than the detector's ability to measure that loss. For the graph in FIG. 10, that means that the fiber optic ferrule should have an end face angle ($\alpha$) that is less than 6° when the detector's lower limit is −65 dB. When the limit is −55 dB (typical of standard photodetectors), then it would be better to have a fiber optic ferrule with a 4° degree end face angle so that any back reflection due to an air gap (i.e., exposure of the optical fiber to air) can be positively detected.

In performing these tests, it is best to have the initial optical signal at a low power, i.e., milliwatts or less. Other powers of the signal may work, however, it is important not to have too large of a power that may overheat the optical fiber and permanently damage the components.

An exemplary schematic of the system noted above is illustrated in FIG. 11.

Figure 9:
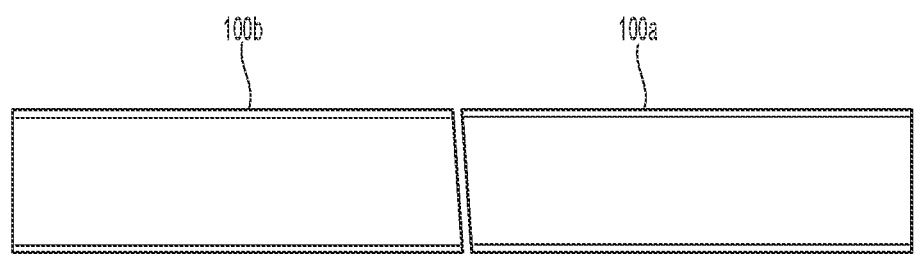
FIG. 9 is side elevational view of two fiber optic ferrules represented in a physical contact with one another.

There are two fiber optic ferrules 102a,102b, with one shown connected to a plurality of optical fibers 122. The plurality of optical fibers 122 are then optically and mechanically attached to the transceiver 130 having a light source (e.g., laser) and a photodiode (detector). The transceiver 130 or a laser module (not shown) would be able to send the low power and higher power optical signals through the optical fibers 122 to the first fiber optic ferrule 100a. The transceiver 130 or another piece of test equipment would be able to read the back reflection from the two mated ferrules 102a,102b. FIG. 9 schematically shows two such fiber optic ferrules (e.g., 100a, 100b) in a mated condition.

If the back reflection reading is in excess of −65 dB (between −18 and −65), then the fiber optic ferrule 100 needs to be removed, cleaned, and re-mated because there is most likely an air gap. Continuing at this point without cleaning the fiber optic ferrule 100 would most likely cause damage to the system if the higher power optical signal were introduced. If a new signal does not provide a reading after the cleaning and re-mating, then it can be determined that the air gap has been fixed, since no significant back reflection was present or detected.

If the original, low power signal did not provide a reading in the first instance, then the user should be confident that there is no air gap in the connection and the system may be used. Subsequently, a higher power optical signal (e.g., at a full power of the transceiver) can be sent to the mated pair of angled end face ferrules 102a, 102b, as may be needed for optimal optical communications over an optical link that includes the two mated ferrules 102a,102b.

The invention also relates to a method for determining a presence of physical contact between a pair of mated fiber-optic ferrules having complementary angled end faces for mating. The method includes sending a first optical signal at less than a full power level of a light source through at least one optical fiber in a first fiber optic ferrule in the pair of fiber optic ferrules. The method includes detecting a back reflection at a photodetector of a transceiver unit in optical communication with the at least one optical fiber, the photodetector being a part of the transceiver unit. The method includes sending a second optical signal at the full power level of the light source through the at least one optical fiber only after the detecting step does not detect the back reflection at the photodetector. That is, for the angled end face ferrules, when there is no back reflection detected, with the method if this invention, the user is assured of a proper physical contact between the mating ferrules.

The method may also include that the angled end faces of each of the fiber optic ferrules in the pair of mated fiber-optic ferrules are at an angle between 1 and 7 degrees relative to respective longitudinal axes of each of the fiber optic ferrules in the pair of mated fiber-optic ferrules.

Additionally, the method may also include that the angled end faces of each of the fiber optic ferrules in the pair of mated fiber-optic ferrules are at an angle between 1 between 3 and 5 degrees relative to respective longitudinal axes of each of the fiber optic ferrules in the pair of mated fiber-optic ferrules.

The method also includes ensuring detection of any back reflection using standard detection apparatus where the angled end faces of each of the fiber optic ferrules in the pair of mated fiber-optic ferrules are at an angle of about 4 degrees relative to respective longitudinal axes of each of the fiber optic ferrules in the pair of mated fiber-optic ferrules.

The method may also include the step of sending the second optical signal is carried out when the back reflection is less than −55 dB.

According to yet another aspect of this disclosure, a method of making or manufacturing a ferrule is disclosed. More particularly, an angle of the end face of the ferrule is modulated based upon a sensitivity value of the photodetector. For example, the ferrule manufacturer can receive specific photodetector sensitivity values. Then based upon the data in the plot of FIG. 10 regarding return loss detectable by the photodetector versus the angle of the fiber tip in air (which is same as the end face angle of the ferrule), the end face of the ferrule may be polished to satisfy the photodetector back reflection detection sensitivity criteria. In this manner, different system designers with varying photodetector sensitivities can order customized end face angled ferrule and not be forced to choose only 0° or 8° end face angle on their ferrule, especially when the photodetectors in the system cannot really detect back reflection due to an air gap of an 8° angled ferrule end face. Once the system designer or end user can confirm that a smaller angled end face customized per their requirements (e.g., 4° end face angle) is satisfactory for such a ferrule, that angle can be locked-in for mass production of thousands of such angled end face ferrules for a particular end user/system designer with a particular photodetector sensitivity value/range.

There are other reasons that an endface angle less than 8 degrees is beneficial. The endface angle creates a slip plane on the ferrule. When the friction coefficient between the mating endfaces is less than the sine of the endface angle, the ferrules slip relative to one another during mating. For an 8 degree endface, the ferrules slip when the coefficient of friction <sin(8 degrees) or 0.14. The amount of slip in a pair of conventional MT ferrules today, varies from one mate to another and this affects the insertion loss. Therefore, reducing the endface angle reduces the likelihood that a ferrule will slip during mating. In addition, when the ferrules slip during mating, there is a slip force applied to the guide pins. The slip force on each guide pin is directly related to the angle of the endface and given by the formula ½*Sin (endface angle)*Spring force of connector. The force applied to the guide pins creates a deformation of the ferrule hole in the direction of the slip. If the amount of deformation varies, the repeatability of insertion loss will suffer. In summary, the smaller endface angle would reduce the likelihood of the ferrules slipping and if they do slip, also reduce the variation in the deformation of the guide hole.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic ferrule comprising:
a top surface;
a bottom surface;
a first side surface and a second side surface extending between the top surface and the bottom surface;
a front face extending between the top surface and the bottom surface;
a rear face extending between the top surface and the bottom surface and having an opening to receive optical fibers for termination at the fiber optic ferrule; and
a longitudinal axis extending between the front face and the rear face, wherein the front face has an angle relative to a plane perpendicular to the longitudinal axis, the angle being between 1 and 7 degrees.

2. The fiber optic ferrule according to claim 1, wherein the angle is between 3 and 5 degrees.

3. The fiber optic ferrule according to claim 1, wherein the angle is about 4 degrees.

4. A fiber optic ferrule comprising:
a main body having a top surface and a bottom surface, a first side surface extending between the top surface and the bottom surface and a second side surface extending between the top surface and the bottom surface on opposites sides of the main body, a front face at a front end of the main body, and a rear face at a rear end of the main body;
a rear central opening extending into the main body from the rear end face and configured to receive at least one optical fiber; and
wherein the front face at the front end of the main body is angled between 1 and 7 degrees such that a distance between the front face and the rear face is greater on the top surface than on the bottom surface.

5. The fiber optic ferrule according to claim 4, wherein the front face is angled at about 4 degrees.

6. The fiber optic ferrule according to claim 4, wherein the fiber optic ferrule has a back-reflection of an optical signal sent through the at least one optical fiber when exposed to air, the back-reflection being at a first predetermined value and the first predetermined value is detectable by a detection apparatus.

7. The fiber optic ferrule according to claim 6, wherein the fiber optic ferrule has a back-reflection of an optical signal sent through the at least one optical fiber when the fiber optic ferrule is in physical contact with a second fiber optic ferrule, the back-reflection having a second predetermined value and the second predetermined level is not detectable by the detection apparatus.

8. A fiber optic ferrule with at least one optical fiber comprising:
a front face having an angle and is non-perpendicular to a longitudinal axis through the fiber optic ferrule, wherein the angle is more than 0° but less than 8°;
the fiber optic ferrule having a back-reflection of an optical signal sent through the at least one optical fiber when exposed to air, the back-reflection being at a first predetermined value;
the fiber optic ferrule having a back-reflection of an optical signal sent through the at least one optical fiber when the fiber optic ferrule is in physical contact with a second fiber optic ferrule, the back-reflection having a second predetermined value;
wherein the first predetermined level is detectable by a detection apparatus and the second pre-determined level is not detectable by the detection apparatus.

9. The fiber optic ferrule with at least one optical fiber according to claim 8, wherein the angle is between 0.5 and 6 degrees.

10. The fiber optic ferrule with at least one optical fiber according to claim 8, wherein the angle is between 3 and 5 degrees.

11. The fiber optic ferrule with at least one optical fiber according to claim 8, wherein the angle is 4 degrees.

12. The fiber optic ferrule with at least one optical fiber according to claim 8, wherein the optical signal sent through the at least one optical fiber is at a low power.

13. The fiber optic ferrule with at least one optical fiber according to claim 8, wherein the optical signal is sent through the at least one optical fiber at a higher power only after the back-reflection is not detectable by the detection apparatus.

14. The fiber optic ferrule with at least one optical fiber according to claim 8, wherein the first predetermined level is between −18 dB and −55 dB of optical power.

15. The fiber optic ferrule with at least one optical fiber according to claim 8, wherein the second predetermined level is less than −55 dB of optical power.

16. The fiber optic ferrule with at least one optical fiber according to claim 8, wherein the detection apparatus comprises a photo-detector of a transceiver unit on a circuit board.

* * * * *